United States Patent [19]

Sawamura et al.

[11] Patent Number: 4,711,861

[45] Date of Patent: Dec. 8, 1987

[54] SINTERED ALUMINUM NITRIDE BODY AND METHOD FOR MAKING

[75] Inventors: Kentaro Sawamura; Yoshio Kosaka; Masayasu Yamaguchi, all of Tokyo, Japan

[73] Assignee: TDK Corporation, Tokyo, Japan

[21] Appl. No.: 16,957

[22] Filed: Feb. 20, 1987

Related U.S. Application Data

[63] Continuation of Ser. No. 787,091, Oct. 15, 1985, abandoned.

[30] Foreign Application Priority Data

| | | | |
|---|---|---|---|
| Oct. 15, 1984 | [JP] | Japan | 59-215971 |
| Dec. 17, 1984 | [JP] | Japan | 59-265852 |
| Dec. 17, 1984 | [JP] | Japan | 59-265853 |
| Dec. 17, 1984 | [JP] | Japan | 59-265855 |
| Dec. 17, 1984 | [JP] | Japan | 59-265856 |

[51] Int. Cl.[4] .......... C04B 35/58

[52] U.S. Cl. .......... 501/98; 501/87; 501/96; 501/152

[58] Field of Search .......... 501/96, 87

[56] References Cited

U.S. PATENT DOCUMENTS

| | | | |
|---|---|---|---|
| 3,108,887 | 10/1963 | Lenie et al. | 106/62 |
| 4,113,830 | 9/1978 | Mazdiyasni et al. | 264/101 |
| 4,435,513 | 3/1984 | Komeya et al. | 501/96 |
| 4,547,471 | 10/1985 | Huseby et al. | 501/98 |

FOREIGN PATENT DOCUMENTS

| | | | |
|---|---|---|---|
| 57-175777 | 10/1982 | Japan . | |
| 57-166371 | 10/1982 | Japan . | |
| 57-166372 | 10/1982 | Japan . | |
| 59-88373 | 5/1984 | Japan . | |
| 60-151281 | 8/1985 | Japan . | |
| 60-151280 | 8/1985 | Japan . | |
| 60-151279 | 8/1985 | Japan . | |
| 61-10073 | 1/1986 | Japan . | |
| 61-10072 | 1/1986 | Japan . | |
| 571497 | 10/1977 | U.S.S.R. | 501/97 |

OTHER PUBLICATIONS

"Effect of Various Additives on Sintering of Aluminum Nitride", Komeya et al., Yogyo-Kyodai-Shi, 89, [6], 1981.

Excerpt from 23rd Ceramics Essential Conference, Presentations, 2A01, 2A02, and 2A03.

*Primary Examiner*—Ferris H. Lander
*Attorney, Agent, or Firm*—Oblon, Fisher, Spivak, McClelland, & Maier

[57] ABSTRACT

A sintered aluminum nitride body is produced by adding to aluminum nitride powder at least one sintering aid selected from the borides, carbides, nitrides and fluorides of calcium, strontium, barium and rare earth metals and mixtures thereof in an amount of 0.01 to 10% by weight ofthe aluminum nitride, molding the mixture, and sintering in a non-oxidizing atmosphere.

14 Claims, No Drawings

SINTERED ALUMINUM NITRIDE BODY AND METHOD FOR MAKING

This application is a continuation of application Ser. No. 787,091, filed on Oct. 15, 1985, now abandoned.

BACKGROUND OF THE INVENTION

This invention relates to a sintered body of aluminum nitride and method for making.

Sintered alumina bodies have been employed as an insulating substrate for supporting integrated circuits such as silicon chips. However, alumina substrates have a poor thermal conductivity and a higher coefficient of thermal expansion than silicon, resulting in many disadvantages including the poor adhesion of large-sized silicon chips thereto.

One of substituted for alumina is beryllium oxide, which has a thermal conductivity higher than that of alumina by a factor of ten or more. The beryllium oxide, however, is not readily available or handled because it is toxic and expensive.

Silicon carbide substrates were also developed. Production cost is undesirably increased by the use of a hot press in sintering. Also disadvantageously, silicon carbide substrates have a high dielectric constant and a low dielectric strength because silicon carbide is in itself a semiconductor.

Great attention is now paid to sintered bodies of aluminum nitride (AlN) which has a high thermal conductivity and electrical resistance. Aluminum nitride is also characterized by a coefficient of thermal expansion approximate to that of silicon and a low dielectric constant. To take advantage of these attributes, the aluminum nitride sintered bodies must be dense and low in oxygen content.

Since low oxygen content aluminum nitride powder alone can not be sintered well, there is the need for sintering aids capable of promoting sintering. A variety of sintering aids have heretofore been proposed.

For example, one known method is by adding aluminum oxide ($Al_2O_3$) or yttorium oxide ($Y_2O_3$) to aluminum nitride powder followed by sintering under ambient pressure or hot pressing. Japanese Patent Publication No. 58-49510 discloses a method for sintering aluminum nitride powder in admixture with calcium oxide (CaO), barium oxide (BaO) and/or strontium oxide (SrO) under ambient pressure. Japanese patent application Kokai No. 58-32073 discloses the addition of boron nitride (BN) to aluminum nitride powder. The mixture is sintered in a non-oxidizing atmosphere under ambient pressure or hot pressed. Japanese patent application Kokai No. 59-50077 discloses to add a powder mixture containing at least one member selected from the group consisting of CaO, BaO, and SrO to aluminum nitride powder. The mixture is then hot pressed in a non-oxidizing atmosphere.

Among these prior art techniques, the addition of oxides adversely affects thermal conductivity. The addition of boron nitride is believed favorable among others because the resulting sintered aluminum nitride bodies have a higher thermal conductivity and a higher density.

However, all these conventional sintered bodies of aluminum nitride prepared by any of the above-mentioned methods are disadvantageous in that uneven sintering is likely to occur to such an extent that white spots are sometimes observed on the surface even with the naked eyes. The uneven sintering also results in products having inconsistent electrical resistivity (volume resistivity).

In order to eliminate these disadvantages, there has long been desired to produce an improved sintered body of aluminum nitride using a novel sintering aid.

SUMMARY OF THE INVENTION

It is, therefore, an object of the present invention to provide a novel and improved sintered aluminum nitride body having characteristics suitable for an electrical insulating substrate material such as high density, thermal conductivity and electrical resistance, and uniformity in sintering, while being inexpensive and easy to sinter.

Another object of the present invention is to provide an improved method for efficiently making such a sintered aluminum nitride body.

These objects can be achieved by the present invention which is directed to a sintered aluminum nitride body comprising aluminum nitride in admixture with a sintering aid. According to a first aspect of the invention, the sintering aid is selected from the group consisting of borides, carbides, nitrides and fluorides of calcium, strontium, barium and rare earth metals, and mixtures thereof.

According to a second aspect of the invention, there is provided a method for making a sintered aluminum nitride body comprising mixing aluminum nitride and at least one sintering aid selected from the group consisting of borides, carbides, nitrides and fluorides of calcium, strontium, barium and rare earth metals, and mixtures thereof, molding the mixture into a compact, and sintering the compact in a non-oxidizing atmosphere.

DETAILED DESCRIPTION OF THE PREFERRED EMBODIMENTS

According to the present invention, sintered aluminum nitride bodies are produced by adding sintering aids to aluminum nitride powder before compaction and sintering.

The aluminum nitride powder may preferably be finely divided to an average particle size ranging from about 0.1 to 10 μm, and most preferably from about 0.5 to 6 μm. Also preferably, the AlN powder may have a low oxygen content or be oxygen free.

The sintering aids used herein are borides, carbides, nitrides and fluorides of calcium, strontium, barium and rare earth metals, and mixtures thereof. The sintering aids are described in detail.

A first group of sintering aids includes the borides of calcium, strontium, barium and rare earth metals. Calcium boride is commercially available and represented by chemical formula $CaB_6$ and believed to have an atomic ratio of Ca to B substantially conforming to this formula with a more or less deviation. Similar explanation applies to strontium boride conforming to $SrB_6$ and barium boride conforming to $BaB_6$. Some illustrative examples of the borides of rare earth metals (Sc, Y, La to Lu) include $YB_6$, $LaB_6$, $CeB_6$, $PrB_6$, $SmB_6$, and $NdB_6$.

A second group of sintering aids includes the carbides of calcium, strontium, barium and rare earth metals. Calcium, strontium, and barium borides are represented by chemical formulas $CaC_2$, $SrC_2$, and $BaC_2$, respectively. Examples of the carbides of rare eath metals include $YC_2$, $LaC_2$, and $CeC_2$.

A third group of sintering aids includes the nitrides of calcium, strontium, barium and rare earth metals. Calcuim, Strontium, and barium nitrides are represented by chemical formulas $Ca_3N_2$, $Sr_3N_2$, and $Ba_3N_2$, respectively. Examples of the nitrides of rare earth metals include YN, LaN, CeN, PrN, NdN, and SmN. The nitrides are rather less favorable in a strict sense because they tend to decompose or degrade in mositure and thus require a careful handling.

A fourth group of sintering aids includes the fluorides of calcium, strontium, barium and rare earth metals. Calcium, strontium, and barium fluorides are represented by chemical formulas $CaF_2$, $SrF_2$, and $BaF_2$, respectively. Examples of the fluorides of rare earth metals include $YF_3$, $LaF_3$, $CeF_3$, $SmF_3$, and $NdF_3$. The fluorides are also rather less favorable in a strict sense because they are less reactive and deleterious to the sintering furnace. They require a careful handling because of emission of harmful gases. Among these fluorides, some compounds such as $CaF_2$ (boiling point 2500° C.), $SrF_2$ (boiling point 2460° C.), and $BaF_2$ (boiling point 2260° C.) do not vaporize at the sintering temperature while some compounds will almost vaporize off during sintering.

These sintering aids may be used alone or in admixture of two or more.

It is found that similar compounds of magnesium, which belongs to the alkaline earth metal group, are not effective in sintering aluminum nitride into a dense body.

The sintering aids may preferably have an average particle size in the range between 0.1 and 44 μm, and most preferably 0.5 and 20 μm. The sintering aids are added to aluminum nitride powder preferably in amounts of about 0.01 to 10%, and most preferably, about 1 to 3% by weight of the aluminum nitride. When the sintered aids are added in amounts of less than 0.01 wt % or more than 10 wt %, it is impossible to obtain a dense body by sintering under ambient pressure.

Unlike the conventional sintering aids such as oxides of alkaline earth metals and yttorium, the aids of the present invention do not contain oxygen. It is thus considered that no or substantially no impurities such as oxygen, which deteriorates thermal conductivity, are produced during sintering. Specifically, in the case of metal borides such as calcium boride $CaB_6$, the boron is nitrated to form BN having higher electrical resistivity and thermal conductivity. There is no possibility of forming oxide.

In general, sintered body of aluminum nitride is produced by first adding a powder sintering aid as stated above to aluminum nitride powder. The mixture is then molded into a compact by compression at room temperature. The compact is sintered under ambient pressure in a non-oxidizing atmosphere and then allowed to cool to room temperature.

Mixing of AlN and sintering aid powders is carried out by milling or attriting the mixture in a dry or wet system with or without a milling medium.

The compression molding is carried out under a pressure of the order of about 500 to 2000 kg/cm$^2$.

The non-oxidizing atmosphere is used in sintering to prevent the finely divided AlN powder from being oxidized on the surface.

The non-oxidizing atmosphere may be an inert gas such as nitrogen, argon and helium, hydrogen, carbon monoxide, various hydrocarbons, or mixtures of these gases. Vacuum atmosphere is also employable.

It is desirable that the non-oxidizing atmosphere contain nitrogen, and preferably at least 50% by volume of nitrogen with an inert gas such as argon and helium being optionally mixed.

The sintering may be conducted under ambient pressure which is atmospheric pressure or substantially atmospheric pressure, and usually, in a stream of nitrogen.

The sintering temperature ranges from about 1600° C. to about 1900° C., and most preferably, from about 1750° C. to about 1800° C. in order to effectively achieve sintering. If a temperature of lower than about 1600° C. is employed, the resulting sintered body is not fully densified even after an extended period of sintering. On the contrary, if the sintering temperature exceeds 1900° C., the aluminum nitride is found to vaporize off. At temperatures in excess of 1800° C., the oxygen contained in the body tends to form a solid-solution in the aluminum nitride, inducing a phonon scattering and hence, lowering thermal conductivity.

The sintering time is generally in the range from about 0.5 to 2 hours, and preferably, about one hour at 1750° C.

Hot pressing under a pressure of the order of 100 to 300 kg/cm$^2$ may be also employed to carry out the sintering process.

The aluminum nitride sintered article thus obtained exhibits good properties without uneven sintering, as demonstrated by a density of 90% or more of the theoretical density of aluminum nitride, an electrical resistivity of $10^{12}$ Ω cm or higher, and a thermal conductivity of 80 W/m·K or higher, all at room temperature. It has a coefficient of thermal expansion of about $5\times10^{-6}$.

Although conventional aluminum nitride sintered bodies have an electrical resistivity with variations ranging from 10 to 20%, the sintered body of the present invention has an electrical resistivity with only about 1% variation due to its substantially uniform sintering.

The sintered aluminum nitride body of the present invention is of high quality without uneven sintering because it comprises aluminum nitride in admixture with at least one sintering aid selected from the group consisting of borides, carbides, nitrides and fluorides of calcium, strontium, barium and rare earth metals, and is formed by adding the sintering aid to the powder aluminum nitride in amounts of 0.01 to 10% by weight of the aluminum nitride, molding the mixture into a compact and sintering the compact in a non-oxidizing atmosphere.

The sintered aluminum nitride body of this invention has further advantages of high density, thermal conductivity and dielectric strength. In addition to these good sintering properties without uneven sintering, the sintered aluminum nitride body of this invention exhibits good adhesion to silicon chips and little variation in electrical resistivity, possessing every character suitable for use as electrical insulating substrates for integrated circuits and other heat dissipating substrates.

Since the method of this invention employs sintering under ambient pressure, the sintered aluminum nitride body can be produced in a simple manner at low cost.

The sintered body of aluminum nitride according to the present invention is not particularly limited in shape and size, and may take any desired form including thin and thick plates and discs.

EXAMPLES

In order that those skilled in the art will better understand how to practice the present invention, examples are given below by way of illustration and not by way of limitation.

EXAMPLE 1

To aluminum nitride powder having an average particle size of 5 μm was added $CaB_6$ powder having an average particle size of 10 μm in an amount of 0.1% by weight of the AlN powder. The mixture was fully milled and then molded into a compact under a pressure of 1000 kg/cm$^2$ at room temperature.

The compact was heated to 1750° C. in a stream of nitrogen, maintained at 1750° C. for one hour, and thereafter furnace cooled to room temperature. The thus sintered AlN body is designated Sample 11.

Samples 12 and 13 were also prepared by the same procedure as Sample 11 except that $CaB_6$ powder was added in amounts of 1.0 and 5.0% by weight of the AlN powder, respectively.

For comparison, samples were prepared by the same procedure as Sample 11 except that calcium carbonate ($CaCO_3$) was added as the sintering aid in amounts of 0.1, 0.5 and 1.0% by weight of the AlN powder. These comparative samples are designated Samples 51, 52 and 53, respectively.

Another sample was prepared by the same procedure as Sample 11 except that yttria ($Y_2O_3$) was added to AlN powder as the sintering aid in an amount of 1.0% by weight of the AlN powder. This is designated Sample 61.

In the same way, sample 71 was prepared by adding 3% by weight of boron nitride (BN) to AlN powder.

Samples 11 to 13, 51 to 53, 61 and 71 were measured for the following properties. The results are shown in Table 1.

(1) Density and relative density

Actual density of a sample was measured by a conventional method. Relative density is the actual density divided by the theoretical density.

(2) Electric resistivity and its variation

Ag paste was applied and baked to either surface of a sample in the form of a disc of 30 mm diameter and 2 mm thick to form electrodes. Ten specimens for each group were measured for electric resistivity at a temperature of 23° C. and a relative humidity of 50%. An average value was calculated therefrom. The range between the maximum and the minimum resistivity is also shown in Table 1.

(3) Thermal conductivity

The same disc sample as used in resistivity measurement (2) was measured for thermal conductivity at room temperature except that the Ag paste was omitted herein.

(4) Unevenly sintered area

The area of short sintering appearing as white spots on a sample was determined.

TABLE 1

| Sample No. | Sintering aid (wt %) | Density g/cm$^3$ | Relative density % | Thermal conductivity W/m · K | Electric resistivity Ωcm | Range of electric resistivity | Unevenly sintered area % |
|---|---|---|---|---|---|---|---|
| 11 | $CaB_6$ (0.1) | 3.20 | 98.2 | 95 | $1 \times 10^{13}$ | $1\text{–}2 \times 10^{13}$ | 1 |
| 12 | $CaB_6$ (1.0) | 3.26 | 100 | 110 | $8 \times 10^{13}$ | $7\text{–}9 \times 10^{13}$ | 0 |
| 13 | $CaB_6$ (5.0) | 3.10 | 95 | 90 | $2 \times 10^{13}$ | $1\text{–}3 \times 10^{13}$ | 0 |
| 51* | $CaCO_3$ (0.1) | 2.61 | 80 | — | — | — | — |
| 52* | $CaCO_3$ (0.5) | 3.20 | 98.2 | 60 | $5 \times 10^{13}$ | $0.9\text{–}8 \times 10^{13}$ | 10 |
| 53* | $CaCO_3$ (1.0) | 3.16 | 96.9 | 85 | $2 \times 10^{13}$ | $1\text{–}5 \times 10^{13}$ | 6 |
| 61* | $Y_2O_3$ (1.0) | 3.26 | 100 | 100 | $3 \times 10^{13}$ | $0.2\text{–}6 \times 10^{13}$ | 30 |
| 71* | BN (3) | 2.35 | 72.1 | — | — | — | — |

*comparative examples

EXAMPLE 2

To aluminum nitride powder having an average particle size of 3 μm was added various sintering aids of the present invention as specified in Table 2, each in the form of powder having an average particle size of 10 μm and in an amount of 2% by weight of the AlN powder. Each mixture was fully milled and then molded into a compact under a pressure of 1000 kg/cm$^2$ at room temperature.

The compact was heated to 1750° C. in a stream of nitrogen, maintained at 1750° C. for one hour, and thereafter furnace cooled to room temperature. The thus sintered AlN bodies are designated Samples 111, 112 and 113 employing as the sintering aids $SrB_6$, $BaB_6$ and $YB_6$, respectively, Samples 121, 122 and 123 employing $Ca_3N_2$, $Ba_3N_2$ and YN, respectively, Sample 131 employing $CaC_2$, and Samples 141, 142, 143 and 144 employing $CaF_2$, $SrF_2$, $BaF_2$ and $YF_3$, respectively.

For comparison, additional samples were prepared by the same procedure except that calcium carbonate ($CaCO_3$) was added as the sintering aid in amounts of 0.1, 0.5 and 1.0% by weight of the AlN powder. These comparative samples are designated Samples 151, 152 and 153, respectively.

Using the same procedure, Sample 161 was prepared by adding 1.0% by weight of yttria ($Y_2O_3$), Sample 171 was prepared by adding 3% by weight of boron nitride (BN), and Samples 114 and 145 were prepared by adding $MgB_6$ and $MgF_2$ each in an amount of 2% by weight of the AlN powder, respectively.

These samples of the present invention and the comparative examples were measured for the same properties as in Example 1. The results are shown in Table 2.

TABLE 2

| Sample No. | Sintering aid (wt %) | Density g/cm$^3$ | Relative density % | Thermal conductivity W/m · K | Range of electrical resistivity | Unevenly sintered area % |
|---|---|---|---|---|---|---|
| 111 | $SrB_6$ (2) | 3.19 | 97.9 | 92 | $3\text{–}9 \times 10^{13}$ | 0 |
| 112 | $BaB_6$ (2) | 3.19 | 97.9 | 95 | $1\text{–}3 \times 10^{13}$ | 0 |
| 113 | $YB_6$ (2) | 3.26 | 100 | 120 | $2\text{–}7 \times 10^{13}$ | 0 |
| 114* | $MgB_6$ (2) | 1.91 | 58.6 | — | — | — |

TABLE 2-continued

| Sample No. | Sintering aid (wt %) | Density g/cm³ | Relative density % | Thermal conductivity W/m · K | Range of electrical resistivity | Unevenly sintered area % |
|---|---|---|---|---|---|---|
| 121 | $Ca_3N_2$ (2) | 3.23 | 99.1 | 140 | $2\text{-}5 \times 10^{12}$ | 0 |
| 122 | $Ba_3N_2$ (2) | 3.21 | 98.5 | 120 | $3\text{-}5 \times 10^{12}$ | 0 |
| 123 | YN (2) | 3.21 | 98.5 | 130 | $1\text{-}4 \times 10^{12}$ | 0 |
| 131 | $CaC_2$ (2) | 3.23 | 99.1 | 140 | $2\text{-}5 \times 10^{13}$ | 0 |
| 141 | $CaF_2$ (2) | 3.26 | 100 | 130 | $1\text{-}3 \times 10^{13}$ | 0 |
| 142 | $SrF_2$ (2) | 3.22 | 98.8 | 110 | $0.7\text{-}2 \times 10^{13}$ | 0 |
| 143 | $BaF_2$ (2) | 3.22 | 98.8 | 120 | $1\text{-}3 \times 10^{13}$ | 0 |
| 144 | $YF_3$ (2) | 3.26 | 100 | 140 | $2\text{-}5 \times 10^{13}$ | 0 |
| 145* | $MgF_2$ (2) | 1.83 | 56.1 | — | — | — |
| 151* | $CaCO_3$ (0.1) | 2.61 | 80 | — | — | — |
| 152* | $CaCO_3$ (0.5) | 3.20 | 98.2 | 60 | $0.9\text{-}8 \times 10^{13}$ | 10 |
| 153* | $CaCO_3$ (1.0) | 3.16 | 96.9 | 85 | $1\text{-}5 \times 10^{13}$ | 6 |
| 161* | $Y_2O_3$ (1.0) | 3.26 | 100 | 100 | $0.2\text{-}6 \times 10^{13}$ | 30 |
| 171* | BN (3) | 2.35 | 72.1 | — | — | — |

*comparative examples

As seen from Tables 1 and 2, the sintered aluminum nitride body of this invention contains a less unevenly or short sintered area and thus exhibits consistent electric resistivity among a number of products. Good results were also obtained in density, thermal conductivity and electric resistance. Because of these characteristics, the sintered aluminum nitride body of this invention is desirable for use as electrical insulating substrates.

Samples 51, 71, 151 and 171 showed low density and practically unacceptable properties.

These data apparently show the benefits of the present invention.

Sintered aluminum nitride body of this invention also were resistant to thermal cycling when applied as electrical insulating substrates for use in semiconductor power modules.

The same test was made on those sintered bodies prepared by using as the sintering aid compounds of the remaining rare earth metals alone and in admixture. They were found to be equally effective.

Magnesium compounds were found to be less effective.

What is claimed is:

1. A sintered aluminum nitride body prepared by sintering aluminum nitride in admixture with a sintering aid selected from the group consisting of borides; carbides, of calcium, strontium, barium and rare earth metals, and mixtures thereof.

2. The sintered aluminum nitride body according to claim 1, wherein the aluminum nitride and the sintering aid are mixed both in the form of powder, and the sintering aid is added in amounts of 0.0 to 10% by weight of the aluminum nitride.

3. The sintered aluminum nitride body according to claim 2, wherein said powdered aluminum nitride has an average particle size ranging from 0.1–10 μm.

4. The sintered aluminum nitride body according to claim 3, wherein said powdered aluminum nitride has an average particle size ranging from 0.5–6 μm.

5. The sintered aluminum nitride body according to claim 2, wherein said powdered sintering aid has particle sizes in the range of 0.1–44 μm.

6. The sintered aluminum nitride body according to claim 5, wherein said powdered sintering aid has particle sizes in the range of 0.5–20 μm.

7. The sintered aluminum nitride body according to claim 1, wherein the aluminum nitride is sintered in a non-oxidizing atmosphere.

8. The sintered aluminum nitride body according to claim 1, further having thermal conductivity of at least 80 W/m·K.

9. The sintered aluminum nitride body according to claim 1, further having a relative density of at least 90%.

10. The sintered aluminum nitride body according to claim 1, further having a volume resistivity of at least $10^{12}$ Ωcm.

11. The sintered aluminum nitride body according to claim 1, wherein said rare earth metal boride is selected from the group consisting of $YB_6$, $LaB_6$, $CeB_6$, $PrB_6$, $SmB_6$ and $NdB_6$.

12. The sintered aluminum nitride body according to claim 1, wherein said rare earth metal carbide is selected from the group consisting of $YC_2$, $LaC_2$ and $CEC_2$.

13. The sintered aluminum nitride body according to claim 12, wherein said rare earth carbide is $YC_2$.

14. The sintered aluminum nitride body according to claim 1, wherein said body has a substantially uniform electrical resistivity with only about 1% variation throughout the same.

* * * * *